United States Patent
Heng et al.

(10) Patent No.: US 10,380,180 B1
(45) Date of Patent: Aug. 13, 2019

(54) PLAYLIST ANALYTICS

(71) Applicant: Google Inc., Mountain View, CA (US)

(72) Inventors: Keekim Heng, Zurich (CH); Martin Landers, Zurich (CH); Anders Torp Brodersen, Wadenswil (CH); Theodore Kent Hamilton, Küsnacht (CH); Dror Shimshowitz, San Francisco, CA (US)

(73) Assignee: Google LLC, Mountain View, CA (US)

( * ) Notice: Subject to any disclaimer, the term of this patent is extended or adjusted under 35 U.S.C. 154(b) by 215 days.

(21) Appl. No.: 14/307,281

(22) Filed: Jun. 17, 2014

Related U.S. Application Data

(62) Division of application No. 13/434,822, filed on Mar. 29, 2012, now Pat. No. 8,788,659.

(51) Int. Cl.
   *G06F 16/735* (2019.01)

(52) U.S. Cl.
   CPC ................... *G06F 16/735* (2019.01)

(58) Field of Classification Search
   CPC ...................................... G06F 17/735
   See application file for complete search history.

(56) References Cited

U.S. PATENT DOCUMENTS

| | | |
|---|---|---|
| 5,627,657 A | 5/1997 | Park |
| 5,986,200 A | 11/1999 | Curtin |
| 7,685,210 B2 | 3/2010 | Plastina et al. |
| 8,788,659 B1 | 7/2014 | Heng et al. |
| 9,021,370 B1 | 4/2015 | Carlson |
| 2003/0182315 A1 | 9/2003 | Plastina et al. |
| 2005/0098023 A1* | 5/2005 | Toivonen ............ G10H 1/0058 84/615 |
| 2005/0273818 A1 | 12/2005 | Kobayashi |
| 2006/0212444 A1 | 9/2006 | Handman et al. |
| 2006/0263068 A1 | 11/2006 | Jung |
| 2007/0025194 A1 | 2/2007 | Morse et al. |
| 2007/0244880 A1 | 10/2007 | Martin et al. |
| 2007/0282902 A1 | 12/2007 | Bustelo et al. |
| 2008/0092168 A1 | 4/2008 | Logan et al. |
| 2008/0154889 A1* | 6/2008 | Pfeiffer ................. G06F 16/738 |
| 2008/0294277 A1 | 11/2008 | Hicken et al. |
| 2009/0063459 A1* | 3/2009 | Acharya ................. G06F 16/68 |
| 2009/0094095 A1* | 4/2009 | Slaney ................... G06Q 10/10 705/7.29 |
| 2009/0240732 A1 | 9/2009 | Amidon et al. |

(Continued)

OTHER PUBLICATIONS

Lu, Jian, "Video Fingerprinting and Applications: a review," Media Forensics & Security Conference, Vobile, Inc., San Jose, CA, http://www.slideshare.net/jianlu/videofingerprintingspiemfs09d, Last accessed May 30, 2012.

(Continued)

*Primary Examiner* — Van H Oberly
(74) *Attorney, Agent, or Firm* — Lowenstein Sandler LLP

(57) ABSTRACT

Systems and methods can facilitate gathering information generated by network traffic to playlists. Based on analytics and metrics derived from the gathered information and reported, feedback about playlist access patterns can be supplied to interested parties, such as playlist creators/curators. The feedback can enable playlist curators to better tailor playlist content and sequence, potentially reducing a perceived need to skip around inside a playlist and making for a more enjoyable experience for playlist users.

18 Claims, 10 Drawing Sheets

(56) References Cited

U.S. PATENT DOCUMENTS

| | | |
|---|---|---|
| 2010/0070862 A1 | 3/2010 | Partovi et al. |
| 2010/0088327 A1 | 4/2010 | Holm et al. |
| 2010/0094820 A1 | 4/2010 | Purdy |
| 2010/0114979 A1 | 5/2010 | Petersen |
| 2010/0185662 A1* | 7/2010 | Barile .............. G06Q 30/0601 707/769 |
| 2010/0232770 A1 | 9/2010 | Prestenback et al. |
| 2010/0251305 A1* | 9/2010 | Kimble .............. H04N 7/17318 725/46 |
| 2010/0325137 A1 | 12/2010 | Paez |
| 2011/0004669 A1 | 1/2011 | Navar et al. |
| 2011/0022500 A1 | 1/2011 | Scheinfeld et al. |
| 2011/0047131 A1 | 2/2011 | Huang |
| 2011/0138020 A1 | 6/2011 | Pantos et al. |
| 2011/0191684 A1 | 8/2011 | Greenberg |
| 2012/0092343 A1 | 4/2012 | Pruthi et al. |
| 2012/0116883 A1 | 5/2012 | Asam et al. |
| 2012/0124179 A1 | 5/2012 | Cappio et al. |
| 2012/0143998 A1 | 6/2012 | Littlejohn et al. |
| 2012/0230653 A1 | 9/2012 | Redmann |
| 2012/0251305 A1* | 10/2012 | McMillan .............. F01D 5/28 415/182.1 |
| 2012/0271825 A1* | 10/2012 | Garthwaite .......... H04N 21/252 707/736 |
| 2012/0290653 A1 | 11/2012 | Sharkey |
| 2012/0331386 A1 | 12/2012 | Hicken et al. |
| 2013/0097558 A1 | 4/2013 | Lichtenstein |
| 2013/0198335 A1 | 8/2013 | Goel et al. |

OTHER PUBLICATIONS

Media Hedge, "Digital Fingerprinting," White Paper, Civolution and Gracenote, 2010, http://www.civolution.com/fileadmin/bestanden/white%20papers/Fingerprinting%20-%20by%20Civolution%20and%20Gracenote%20-%202010.pdf, Last accessed May 30, 2012.

Milano, Dominic, "Content Control: Digital Watermarking and Fingerprinting," White Paper, Rhozet, a business unit of Harmonic Inc., http://www.rhozet.com/whitepapers/Fingerprinting_Watermarking.pdf, Last accessed May 30, 2012.

Lu, Jian, "Video fingerprinting for copy identification: from research to industry applications," Proceedings of SPIE—Media Forensics and Security XI, vol. 7254, Jan. 2009, http://idm.pku.edu.cn/jiaoxue-MMF/2009/VideoFingerprinting_SPIE-MFS09.pdf, Last accessed May 30, 2012.

Notice of Allowance for U.S. Appl. No. 13/434,822, dated Mar. 17, 2014, 27 pages.

\* cited by examiner

PLAYLIST ANALYTICS

CROSS-REFERENCE TO RELATED CASES

This application is a division of U.S. patent application Ser. No. 13/434,822, filed Mar. 29, 2012, and entitled "PLAYLIST ANALYTICS," the entirety of which is incorporated herein by reference.

TECHNICAL FIELD

This application relates to systems and methods for gathering and reporting on network traffic statistics, and more particularly to gathering and reporting on network traffic statistics associated with playlists.

BACKGROUND

Playlists on a network, such as the Internet, are collections of content chosen by a playlist creator or "curator," and uploaded to the network for public consumption. One example is video playlists. In a video playlist, the playlist curator may arrange the constituent videos in some arbitrary order for playback, but the playlist need not be played back in this order. Instead, a user can pick and choose among videos in the playlist, watching some in their entirety, some for only a brief time, and skipping around and back and forth among the videos. The user can also interact with a viewing session, for example indicating approval of one video, disapproval of another, and so on.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

This specification relates to systems and methods for playlist analytics. The systems and methods can facilitate gathering information generated by network traffic to playlists. Based on analytics and metrics derived from the gathered information and reported, feedback about playlist access patterns can be supplied to interested parties, such as playlist creators/curators. The feedback can enable playlist curators to better tailor playlist content and sequence, potentially reducing a perceived need to skip around inside a playlist and making for a more enjoyable experience for playlist users.

In accordance with one non-limiting implementation a system comprises one or more computer-readable storage media having stored thereon computer executable components. One or more processors execute the following computer executable components stored in the one or more computer-readable storage media: a logging component that logs user traffic and interactions associated with a playlist of content; an analytics component that generates analytics regarding the logged user traffic and interactions with the playlist of content; and a reporting component that generates a report of the analytics.

According to yet another non-limiting implementation, a method, comprises using at least one processor to execute computer executable components stored in a memory to perform the following acts: logging user traffic and interactions associated with a playlist of content; generating analytics regarding the logged user traffic and interactions with the playlist of content; and generating a report of the playlist analytics.

Another aspect relates to the following non-limiting implementation. A system, comprises means for logging user traffic and interactions associated with a playlist of content; means for generating analytics regarding the logged user traffic and interaction with the playlist of content; and means for generating a report of the playlist analytics.

In yet another non-limiting implementation, a method comprises: capturing data associated with network traffic accessing a playlist of content; identifying, in the captured data, a sequence of user interaction with the playlist content; and based on the identifying, generating metrics corresponding to the sequence.

In accordance with another non-limiting implementation, records are aggregated corresponding to user engagement, via a network, of a video playlist. Information is stored, in the records, relating to a sequence of selections of videos in the video playlist corresponding to the user engagement. Based on an interaction requesting selected information, employing search criteria including at least a playlist identifier, a video identifier, and a temporal range to retrieve a subset of records from the stored records. The subset of records is analyzed to identify a departure in the sequence of selections from a default sequence of the video playlist. A recommendation is generated for modification of the playlist based on the analyzing. A visualization is rendered including at least a portion of a formatted version of the analyzed subset of records and the recommendation.

In yet another non-limiting implementation, an apparatus comprises one or more processing devices having computer-executable components that gather statistics associated with accessing, via a data network, playlists of digital media files. The apparatus also comprises one or more storage devices that store records of the statistics, the records describing operations associated with the accessing, the records including at least information specifying sequences of accesses to the digital media files, identifiers of the playlists and of the digital media files, and temporal information corresponding to the sequences of accesses, wherein the computer-executable components further process the records to generate selected metrics derived from the records, and interactively provide reporting of the selected metrics.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
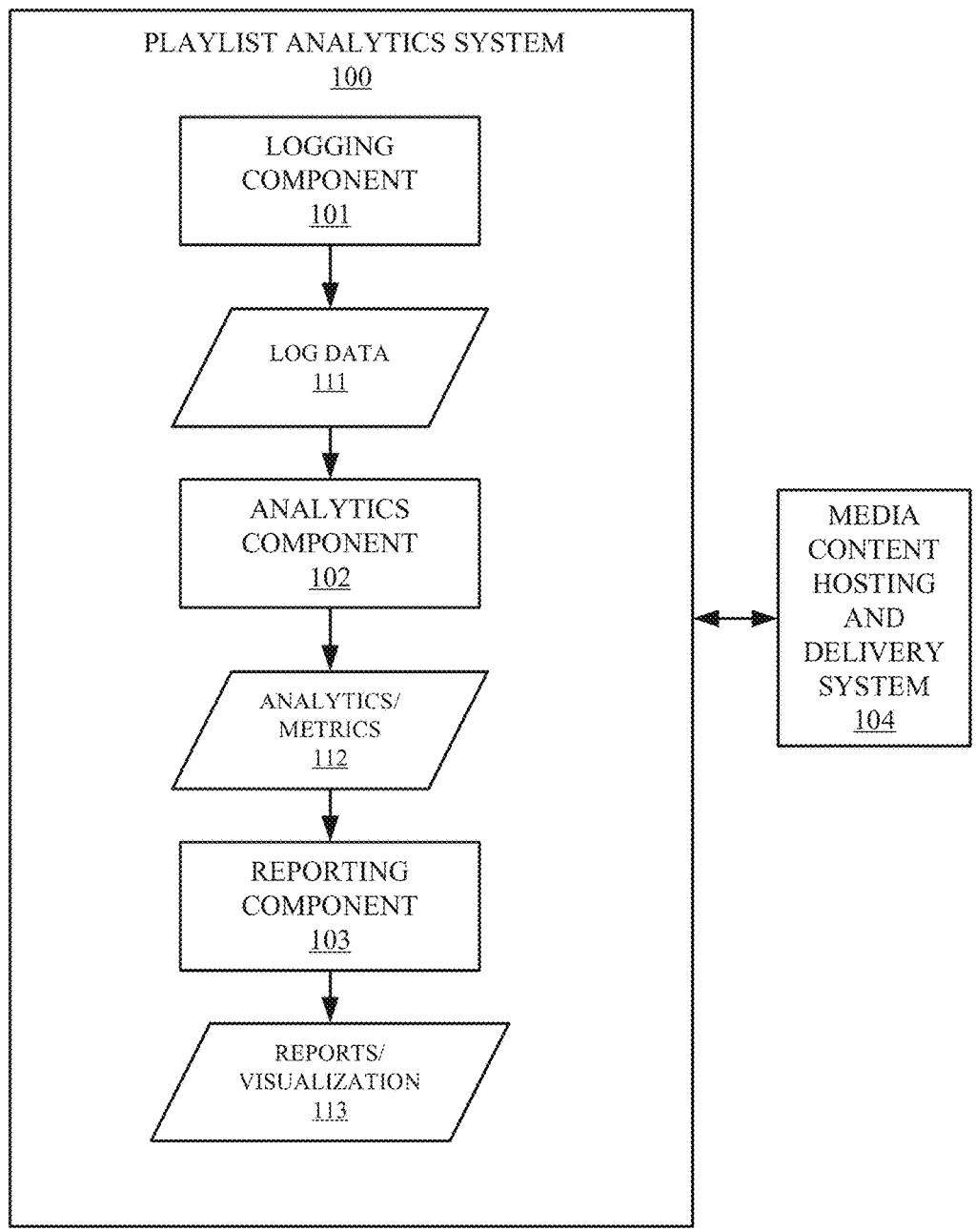
FIG. 1 illustrates a playlist analytics system.

Embodiments of systems and methods for playlist analytics can comprise a logging component, an analytics component and a reporting component. The logging component can log data associated with traffic to a playlist. The analytics component can process the log data to generate analytics and metrics describing aspects of the traffic, and the reporting component can report the analytics and metrics. The reported analytics and metrics can be useful in various ways. For example, a playlist creator or curator can use information in the reported analytics and metrics to make editing decisions about a playlist, leading to, for example, removal of unpopular content from the playlist or changes to a default order of play of content in the playlist. Such changes can, in turn, drive longer and more enjoyable sessions for users who engage playlists. For example, in the case of a video playlist, because an order and content of the video playlist can be made more compatible with viewer preferences by the editing decisions, viewers can be less burdened by the need to actively manage their viewing experiences by making their own video selections.

It is to be appreciated that in accordance with one or more implementations described in this disclosure, users can opt-out of providing personal information, demographic information, location information, proprietary information, sensitive information, or the like in connection with data gathering aspects. Moreover, one or more implementations described herein can provide for anonymizing collected, received, or transmitted data.

Embodiments of the systems and methods for playlist analytics can operate within a communications framework. Examples include data networks such as the Internet or World-Wide-Web ("Web"). In more detail, the embodiments can interact, responsive to user inputs, with a network-based media content hosting and delivery system, supported by network components such as servers linked by various communication media, browsers, protocols including, for example, Internet Protocol (IP) and hypertext transfer protocol (HTTP), web navigation tools such as Uniform Resource Locators (URLs), and the like.

The above-outlined embodiments are now described in more detail with reference to the drawings, wherein like reference numerals are used to refer to like elements throughout. In the following description, for purposes of explanation, numerous specific details are set forth in order to provide a thorough understanding of the embodiments. It may be evident, however, that the embodiments can be practiced without these specific details. In other instances, well-known structures and devices are shown in block diagram form in order to facilitate describing the embodiments.

It should further be understood that the term "component" as used herein, and the variously-labeled component blocks as shown in the drawings, are not intended to suggest that a labeled component is necessarily discrete and separate from another labeled component. The labeled components can be dispersed or intermixed. Additionally, a particular label for a component, rather than indicating any limitation on its capabilities, should be understood as a categorization which generally describes one or a group of structures, capabilities, features or operations associated with the component. However, the structures, capabilities, features or operations may be shared with other components, or may cooperate with other components for combined effects.

Figure 9:
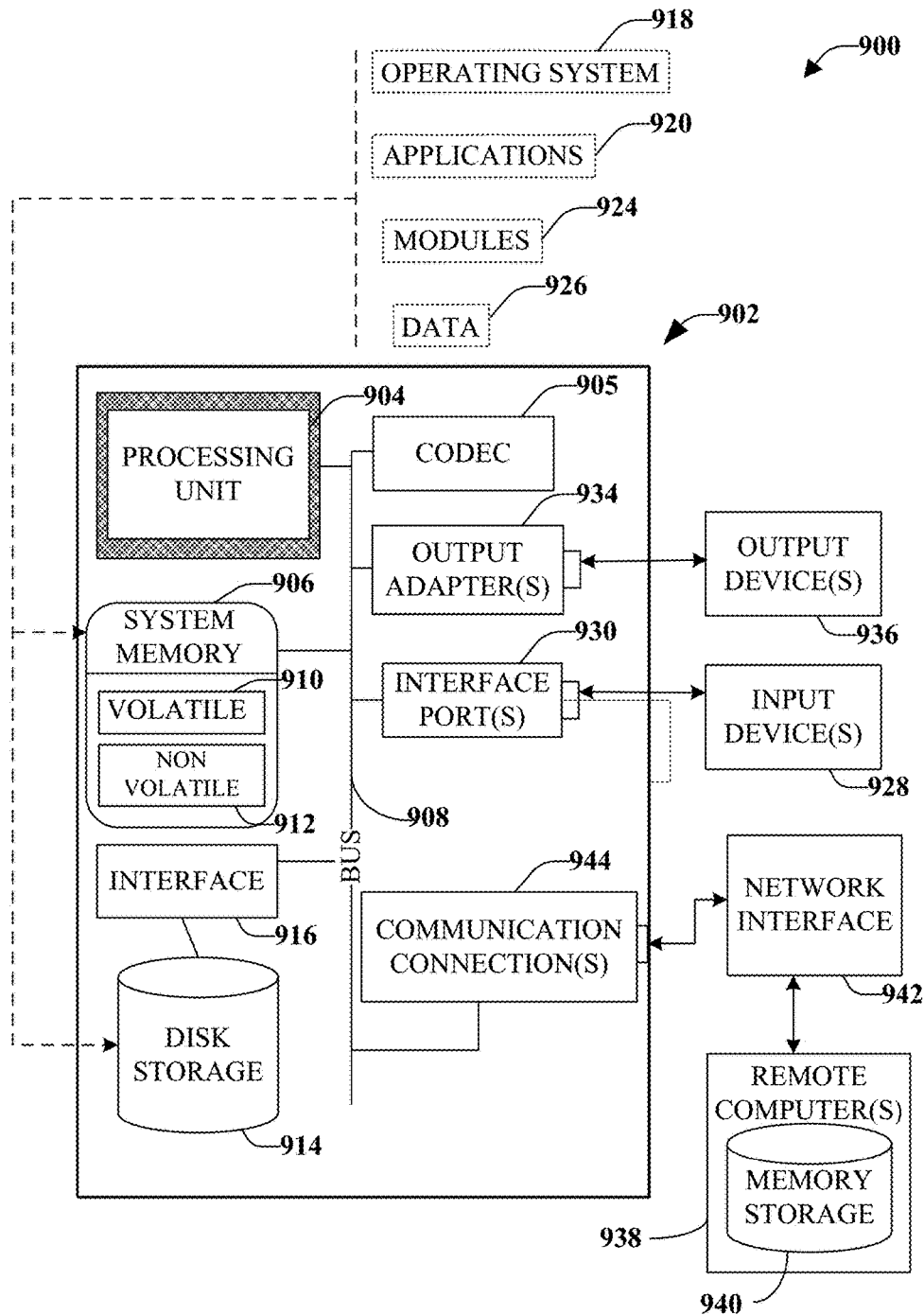
FIG. 9 illustrates an example schematic block diagram for a computing environment in accordance with the subject specification.
Figure 10:
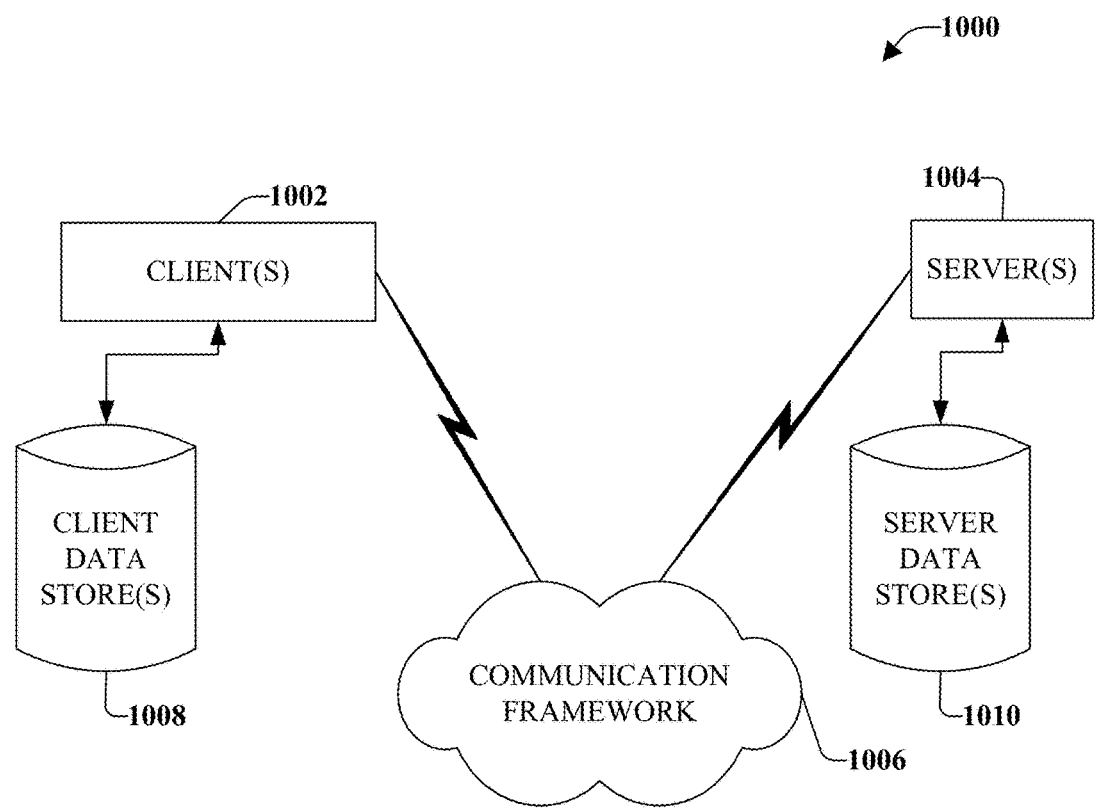
FIG. 10 illustrates an example block diagram of a computer operable to execute the disclosed embodiments.

Examples of network implementations facilitating embodiments of the components are described in more detail further on, with reference to FIGS. 9 and 10.

Referring now to FIG. 1, embodiments of a playlist analytics system 100 can include a logging component 101, an analytics component 102, and a reporting component 103. The logging component 101 can log traffic associated with a playlist to generate or produce log data 111. The traffic can include user traffic and interactions. The analytics component 102 can process the log data 111 to generate or produce analytics or metrics data 112. The reporting component 103 can process the analytics or metrics data 112 to generate or produce report and visualization information 113. The playlist analytics system 100 can interact with a network-based media content hosting and delivery system 104.

The log data 111 can include information associated with network traffic to a playlist. "Traffic" in this context may mean, for example, entering a playlist and consuming (e.g., viewing, listening to), by users, all or a portion of the playlist content, and interactions with the playlist by users. User interactions referred to in the following can be implemented at least partly via web-based mechanisms, such as browsers. More specifically, a user can interact with the media content hosting and delivery system 104 using a browser to supply input signals to an interface with the media content hosting and delivery system 104. In response to the signals, components of the playlist analytics system 100 can interact with the media content hosting and delivery system 104 to effect operations described in the following. A user can be, for example, a registrant with or subscriber to the media content hosting and delivery system 104, or may simply be one casually navigating or "surfing" the Internet.

To promote understanding, the following discusses embodiments of a playlist analytics system using the concrete example of video playlists. However, it should be understood that the concepts described are not limited to applications involving videos, and would find useful application in a variety of other contexts. For example, the components described can be implemented in connection with audio files on a music sharing web site, or for that matter, in connection with any kind of network-based consumption of digital content.

A video playlist can be a list of items of content in video format, in discrete packages or units called "videos." Items on the playlist can be individually selected for playback. A playlist can be assembled by a playlist creator or curator and uploaded to the media (in this example, video) content hosting and delivery system 104 for public viewing. Videos in the playlist may or may not be creations of the curator; that is, individual videos in the playlist may have varied authorship, although the playlist as a whole is the creation of the curator. Copies of videos in the playlist may exist and be accessible elsewhere in the media content hosting and delivery system 104 or a network, individually or in isolation (e.g., not in a playlist).

Figure 2:
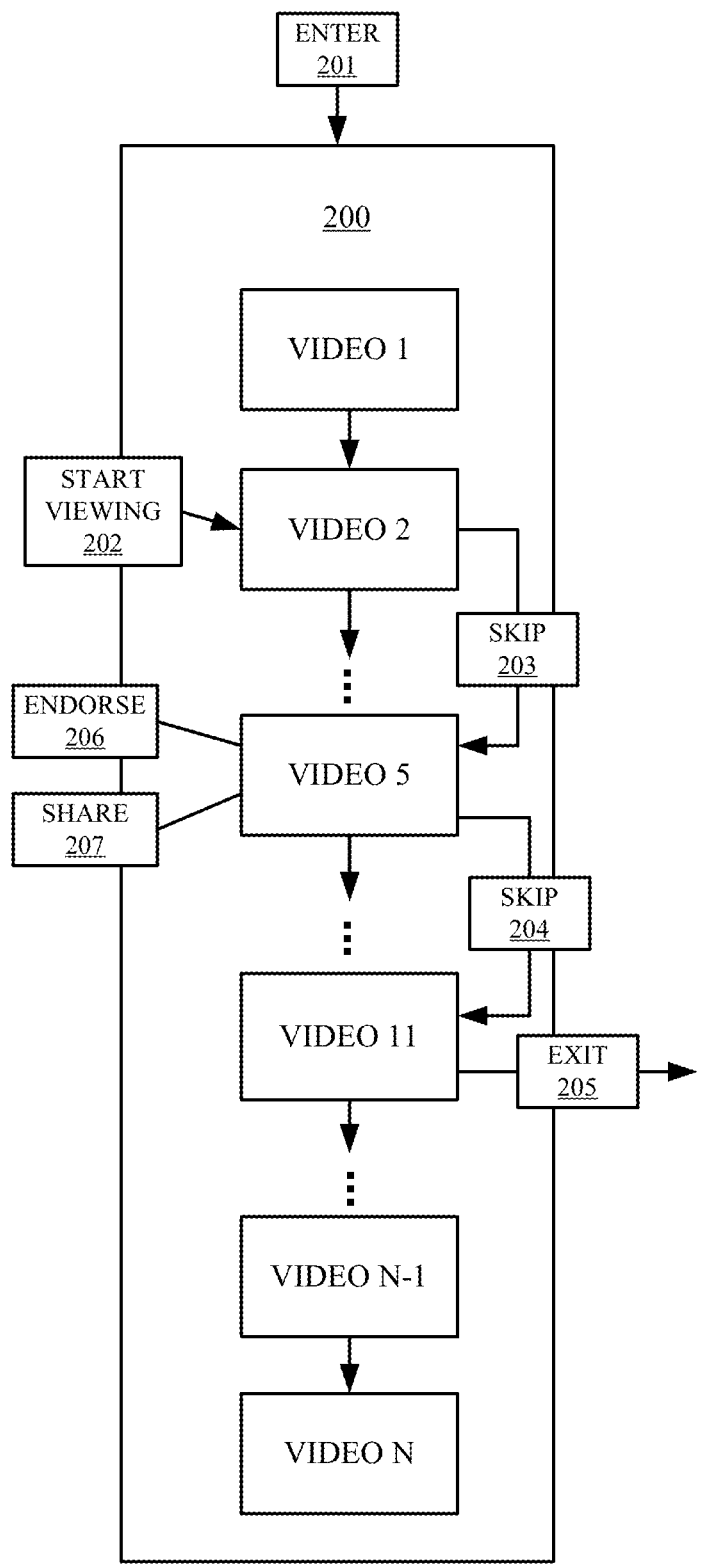
FIG. 2 illustrates a viewing session of a playlist.

FIG. 2 shows an illustrative example of traffic involving a viewing session of a playlist. In FIG. 2, a playlist 200 is entered ("ENTER 201") by a user to begin the session. The playlist 200 comprises N videos (N an integer) arranged in a predetermined list sequence, or default sequence, of video 1, video 2, . . . , video N−1, video N, serially or successively. The list or default sequence may have been chosen, for example, by the playlist curator. In this example, the sequence numbers 1, 2, . . . , N–1, N also serve as video identifiers, but in general, video identifiers and sequence information can be independent of each other, as discussed further in the following.

The viewing session need not follow the serial list sequence, however. For example, by interacting with the playlist, the user can begin on a different video from video 1, the first video in the playlist. In the example of FIG. 2, the session begins on video 2 ("START VIEWING 202"), the second video in the playlist, but could have begun with any of the videos 1-N. A sequence that deviates or departs from the list or default sequence may be referred to herein as a "play sequence." The user then chooses to skip the third and fourth videos ("SKIP 203") in the list sequence, and next view video 5, the fifth video in the list sequence. Then, the user skips videos 6-10 ("SKIP 204") and views video 11. After viewing all or a portion of video 11, the user chooses to exit ("EXIT 205") the playlist entirely. Thus, the viewing session had the play sequence video 2, video 5, video 11.

While viewing video 5, the user performed further interaction with the playlist, by endorsing or indicating approval of the video ("ENDORSE 206"), and sharing the video ("SHARE 207"). "Sharing" in this context may mean, for example, propagating information about the video to another entity or entities in some fashion, such as by e-mailing a link to the video to one or more other users, embedding a link to the video in a website, or notifying a social network about the video. Other kinds of interaction can include, for example, "subscribing" to the video creator or playlist curator, meaning that the user registers or requests to receive notices of other works by the video creator or playlist curator.

Figure 3:
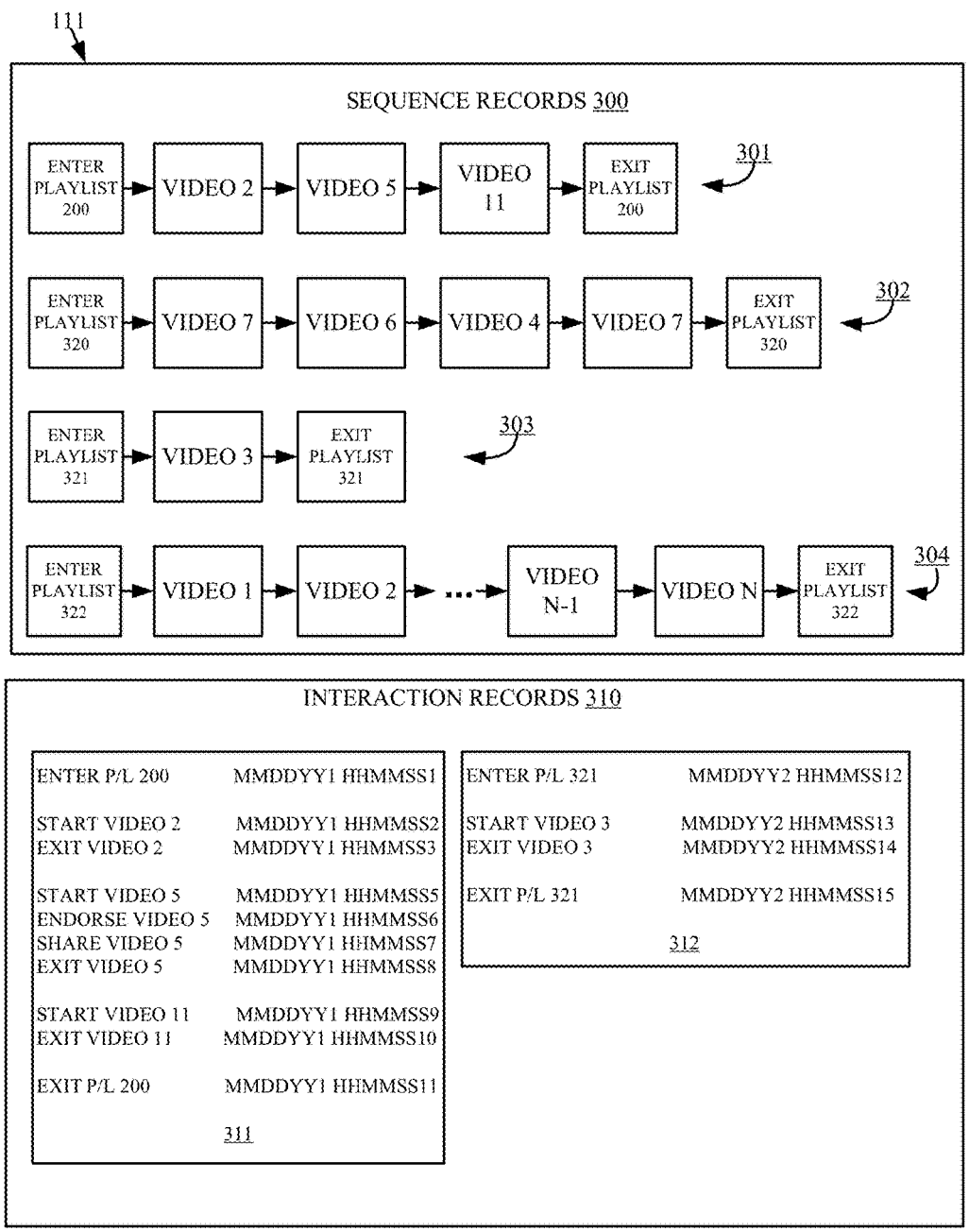
FIG. 3 illustrates records of the playlist analytics system.

As previously discussed, the logging component 101 can log (e.g., monitor, collect, capture, gather, aggregate, record, store) data associated with traffic accessing a playlist such as playlist 200. The logged data can reside in a computing device memory temporarily, for example, and subsequently be stored for a longer term on a storage device such as disk storage, for example. FIG. 3 shows an example of log data 111 that can be logged by the logging component 101. The log data 111 can include sequence records or information 300, and interaction records or information 310. The sequence records 300 and interaction records 310 can include information relating to a sequence of selections of videos in a video playlist corresponding to a user engagement of the playlist, as well as other user actions detected during the engagement. Accordingly, the sequence records 300 and interaction records 310 can more particularly include temporal information, and playlist and video identifier information. It should be understood in the following discussion that the sequence information 300 and interaction information 310 is in no way limited to the representation shown in FIG. 3, which is only to facilitate a conceptual understanding.

In any event, sequence records 300 can identify sequences, or paths or chains, corresponding to user interactions, e.g., selections, in a playlist viewing session as described in connection with FIG. 2. Record 301, represented as the sequence "ENTER PLAYLIST 200→VIDEO 2→VIDEO 5→VIDEO 11→EXIT PLAYLIST 200", corresponds to the example of FIG. 2. Thus, a sequence record can include a playlist identifier (in this case, "200"), and one or more video identifiers (in this case, "2", "5" and "11"). In this example, for conciseness the playlist identifier is a number, and respective video identifiers happen to be numbers corresponding with the position of each video in the default sequence of the playlist. However, this need not be the case. A playlist or video identifier could instead be, for example, a string of characters such as a title, and information denoting the video's position in the default sequence could be independent of the identifier.

Record 302 is another example of a record corresponding to a playlist viewing session, in this case for a playlist having the identifier "320" and describing a sequence for videos having the identifiers "4", "6" and "7", respectively (which again, happen to correspond to each video's position in the default sequence). Record 302 illustrates that a play sequence need not be serial, because record 302 indicates that in playlist 320, video 7 was played first, then video 6 was played, and then video 4 was played. A play sequence can also include repetition, as indicated by a second playing of video 7 after the playing of video 4. As indicated in record 302, playlist 320 was exited after the second playing of video 7.

Record 303 indicates that a playlist having the identifier "321" was entered, and only video 3 of the playlist was played before the playlist was exited. Such an occurrence (only one video of a playlist is played before the playlist is exited) may be referred to as a "bounce." Thus, a playlist can have a "bounce rate," as discussed in more detail further on.

Record 304 indicates that a playlist having the identifier "322" was entered, and the viewing session followed the list or default sequence throughout.

Still referring to FIG. 3, log data 111 can further include interaction records 310. The interaction records 310 can include playlist statistics and video-specific statistics, for example. Such statistics can include information describing actions taken with respect to playlists and particular videos within the playlists. For example, the statistics can indicate when (e.g., date and time) a playlist was entered and exited, and when (e.g., date and time) playback of particular videos within the playlist was begun and ended, and what and when particular actions (e.g., endorse, share) were taken with respect to the particular videos.

To facilitate understanding, interaction record 311 shown in FIG. 3 corresponds to the example of FIG. 2 and the sequence record 301 discussed previously. Thus, interaction record 111 shows that playlist 200 was entered on month-day-year MMDDYY1 and hour-minute-second HHMMSS1, and exited on month-day-year MMDDYY1 and hour-minute-second HHMMSS11. Playback of video 2 was begun on month-day-year MMDDYY1 and hour-minute-second HHMMSS2, and ended on month-day-year MMDDYY1 and hour-minute-second HHMMSS3. Playback of video 5 was begun on month-day-year MMDDYY1 and hour-minute-second HHMMSS5, and ended on month-day-year MMDDYY1 and hour-minute-second HHMMSS8. Video 5 received an endorsement on month-day-year MMDDYY1 and hour-minute-second HHMMSS6, and was shared on month-day-year MMDDYY1 and hour-minute-second HHMMSS7. Playback of video 11 was begun on month-day-year MMDDYY1 and hour-minute-second HHMMSS9, and ended on month-day-year MMDDYY1 and hour-minute-second HHMMSS10.

Interaction record 312 corresponds to the example of sequence record 303, and indicates a "bounce" of playlist 321 on month-day-year MMDDYY2 and hour-minute-second HHMMSS15. Interaction records 310 are, of course, not limited to the foregoing examples, nor are sequence records 300. In view of the volume of traffic associated with the viewing of web-based videos, log data 111 would likely be extensive and comprise numerous records.

It may be appreciated in light of the foregoing that embodiments of the playlist analytics system 100 can gather statistics associated with accessing, via a data network, playlists of digital media files. The statistics can be stored in records including at least information specifying sequences of accesses to the digital media files, identifiers of the playlists and of the digital media files, and temporal information corresponding to the sequences of accesses. For example, the statistics can include aggregated records corresponding to user engagement, via the network, of a video playlist. The records can store information relating to a sequence of selections of videos in the video playlist corresponding to the user engagement, as well as to other user actions detected in the course of the user engagement.

Figure 4:
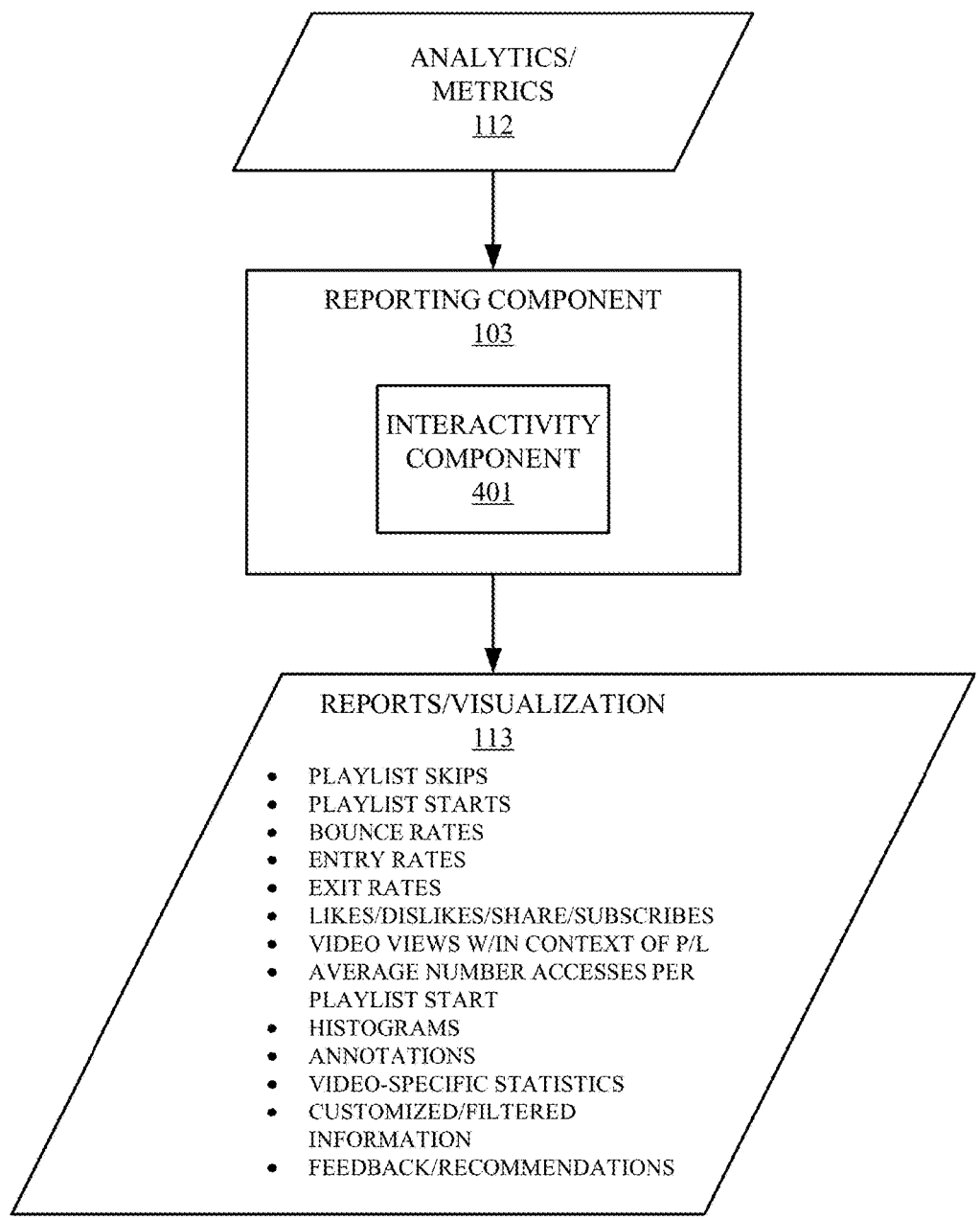
FIG. 4 illustrates aspects of a reporting component of the playlist analytics system.

As indicated previously, referring to FIG. 1, the analytics/metrics components 102 can process (e.g., analyze, organize, classify, perform computations on, perform look-ups or searches on, quantify, correlate sections of, filter, parse, make inferences based on) the log data 111 to generate or produce analytics or metrics data 112. The analytics or metrics data 112 can reside in a computing device memory temporarily, for example, and subsequently be stored for a longer term on a storage device such as disk storage, for example. Referring to FIG. 4, the reporting component 103 can process the analytics or metrics data 112 to generate or produce one or more reports or visualizations (e.g., formatted displays or documents in either tangible or electronic form) 113. The reports or visualizations 113 can reside in a computing device memory temporarily, for example, and subsequently be stored for a longer term on a storage device such as disk storage, for example. The reporting component 103 can include an interactivity component 401 to facilitate the collection and analysis of particular statistics by the logging component 101 and analytics component 102, and the generating of selected, filtered or customized information in the reports or visualizations 113.

For example, based at least partly on user interactions via the interactivity component 401, analytics component 102 can generate analytics relating to one or more skips over content in a default sequence of a playlist, and the reports or visualizations 113 can generate a corresponding report. More specifically, based on analytics/metrics information 112 supplied by the analytics component 102, the reports or visualizations 113 can specify a number of times a given video was skipped in a play sequence, or can specify a rate representing a number of times per playlist access that the given video was skipped.

As another example, analytics component 102 can generate analytics relating to a number of times a playlist is accessed (also, "playlist starts"), and the reports or visualizations 113 can generate a corresponding report.

As still another example, based on analytics relating to a number of times that only one item of a playlist was accessed before the playlist was exited, the reports or visualizations 113 can further include a "bounce rate." For example, if a playlist was entered one hundred times, and three out of the one hundred times only one video or a portion of one video was played before the playlist was exited, the playlist would have a bounce rate of three percent.

Based on analytics relating to a number of times that an item of playlist content is first to be accessed after the playlist is entered, the reports or visualizations 113 can further include metrics describing an "entry rate," e.g., a rate corresponding to a number of times that a play sequence began on a particular video. Similarly, metrics can describe an "exit rate," or a rate corresponding to a number of times that an item of playlist content was last to be accessed before the playlist was exited. Thus, for example, if playlist 200 was entered one hundred times, and five out of the one hundred times the playback sequence began with video 2, video 2 would have an entry rate of five percent. Similarly, if four out of the ten times the play sequence ended with video 11, video 11 would have an exit rate of four percent.

Other metrics of interest that can be generated by the analytics component 102 and included in the reports or visualizations 113 are metrics describing endorsements or disapprovals (also, "likes" or "dislikes") of either a playlist or of individual items within the playlist. The analytics component 102 can further generate, and the reports or visualizations 113 can further include, metrics describing playlist or playlist video subscribes and shares, for example.

Another example of metrics of interest that can be included in the reports or visualizations 113, based on analytics generated by the analytics component 102, are metrics describing video views within the context of a playlist. In more detail, the metrics can measure, for example, how many times a given video was played and for how long, and/or how often a video was "liked" or "disliked" within a playlist, relative to a version of the video existing in isolation or outside the playlist. Similarly, the metrics can contrast playbacks, playback durations, likes/dislikes/shares and so on for particular videos within a playlist relative to other particular videos within the playlist.

Still another metric of interest that can be included in the reports or visualizations 113, based on analytics generated by the analytics component 102, is a metric describing an average number of accesses to playlist items per accesses to the playlist. Thus, for example, a histogram can be generated that shows that of, say, two hundred accesses to a playlist of ten videos, without regard to the identities of specific videos, 15% of playbacks were of five videos, 20% of playbacks were of three videos, and 65% of playbacks were of two videos.

The reports or visualizations 113 can further include annotations indicating where in time changes to playlists were made, and where playback sequences departed from the list or default sequences. The annotations can further include displays of video-specific statistics, e.g., likes/dislikes, shares, subscribes, playback duration and so on, within the context of a playlist. The annotations can further include user comments on either a playlist or individual videos within the playlist.

All of the above information can be useful in a variety of ways. For example, the information can be provided to a playlist curator to facilitate editorial decisions. Thus, a high skip rate, a high number of "dislikes" or a high frequency of short playback durations for a video could suggest to a playlist curator that the video should be removed from the playlist, or that its position in the list or default sequence should be changed. Similarly, a high entry rate for a video that is not first in the list or default sequence could suggest that the playlist be re-ordered so that the video is first in the list or default sequence. A high bounce rate for a playlist could suggest to the playlist curator that more interesting content is needed.

As noted previously, the reporting component 103 can include an interactivity component 401 to facilitate, in response to user interactions, the collection and analysis of particular statistics by the logging component 101 and analytics component 102, and the generating of filtered or customized information in the reports or visualizations 113. Thus, for example, via an interface, a user can make selections to cause certain statistics to be gathered (such as those discussed in the foregoing examples), processed in a particular way, and rendered in a particular form (e.g., formatted displays, printouts and the like). The interactivity component 401 can also, based on an analysis of the statistics, generate a recommendation for modification of a playlist along the lines discussed above, or otherwise as appropriate, and include the recommendation in the rendered report.

In addition to the examples given above, through interactions with the interactivity component 401, a user can, say, cause statistics to be gathered regarding a device or platform (e.g., tablet, notebook, personal computer, mobile communication device) via which a playlist is accessed, and cause platform-specific reports (e.g., reports describing which playlists were accessed via which platforms) to be generated from the gathered statistics.

In embodiments, the reporting component 103 can provide information useful to advertisers. For example, statistics regarding the popularity or unpopularity of playlists and their content, or regarding platforms from which playlists were accessed, can be provided to advertisers to facilitate advertising decisions.

Figure 5:
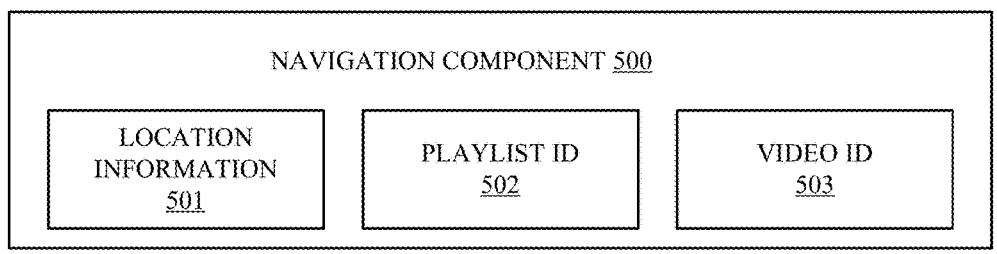
FIG. 5 illustrates a navigation component that can be employed by the playlist analytics system.

As previously noted, embodiments of the video playlist analytics system 100 can be implemented within a network such as the Internet or Web. Network-based navigation techniques can be employed in connection with embodiments of the video playlist analytics system 100. FIG. 5 shows an example of a navigation component 500 that can be employed by embodiments of the video playlist analytics system 100. The navigation component 500 can include network location information 501, along with a playlist identifier (ID) 502 and a video identifier (ID) 503. The navigation component 500 can be or include a URL, for example. The navigation component 500 or a similar mechanism can be used, for example in response to an action by a user, to navigate to a playlist, or to a video within a playlist.

Additionally, records including information such as the playlist ID 502 and video ID 503 can be generated in response to network traffic accessing the video content hosting and delivery system 104, and logged in the log data 111, as indicated in FIG. 3 and accompanying description. In embodiments of the video playlist analytics system 100, the playlist ID and video ID can serve as keys for searches and record retrieval within the log data 111, in order, for instance, to supply particular records to the analytics component 102 and reporting component 103.

In view of the foregoing, embodiments of the playlist analytics system 100 can aggregate records corresponding to user engagement, via a network, of one or more video playlists, and store information relating to sequences of selections of videos in the one or more video playlists corresponding to the user engagement. Another user, such as a playlist curator, can interact with the playlist analytics system 100, for example via the interactivity component 401, to request selected information in the aggregated records. Employing the playlist ID and video ID as keys to serve as at least part of search criteria, the playlist analytics system 100 can search the aggregated records and retrieve the requested information. A temporal range, e.g., a specified starting date and time and ending date and time, can also be provided as a search criterion.

Based on the search criteria applied, the playlist analytics system 100 can retrieve a subset of the aggregated records, and analyze the subset of records. For example, the analysis can identify one or more departures in one or more of the sequences of selections of videos from default sequences of respective corresponding playlists. The playlist analytics system 100 can generate one or more recommendations for modifications of the playlists based on the analyzing, and render one or more visualizations including one or more portions of formatted versions of the analyzed subset of records and the one more recommendations.

Embodiments of the video playlist analytics system 100 can employ object-oriented programming techniques. Such techniques can involve, for example, creating, modifying and storing a "playlist object," with "video objects" forming atomic units of the playlist object.

Figure 6:
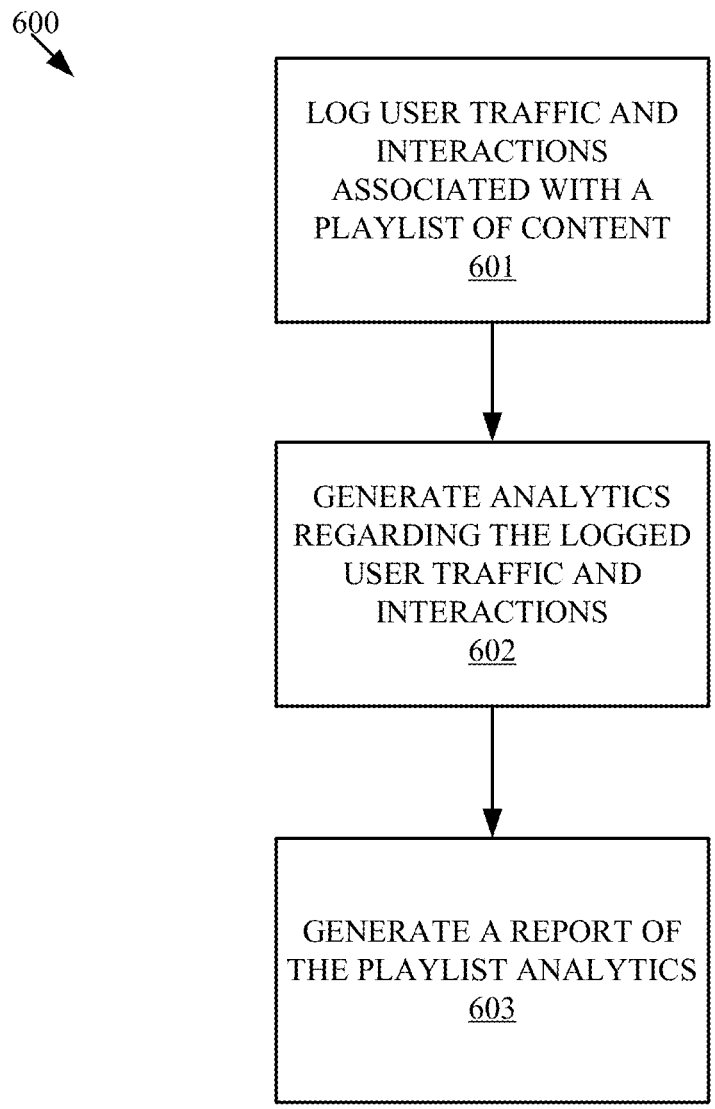
FIGS. 6-8 illustrate examples of methodologies in accordance with embodiments of the playlist analytics system.
Figure 7:
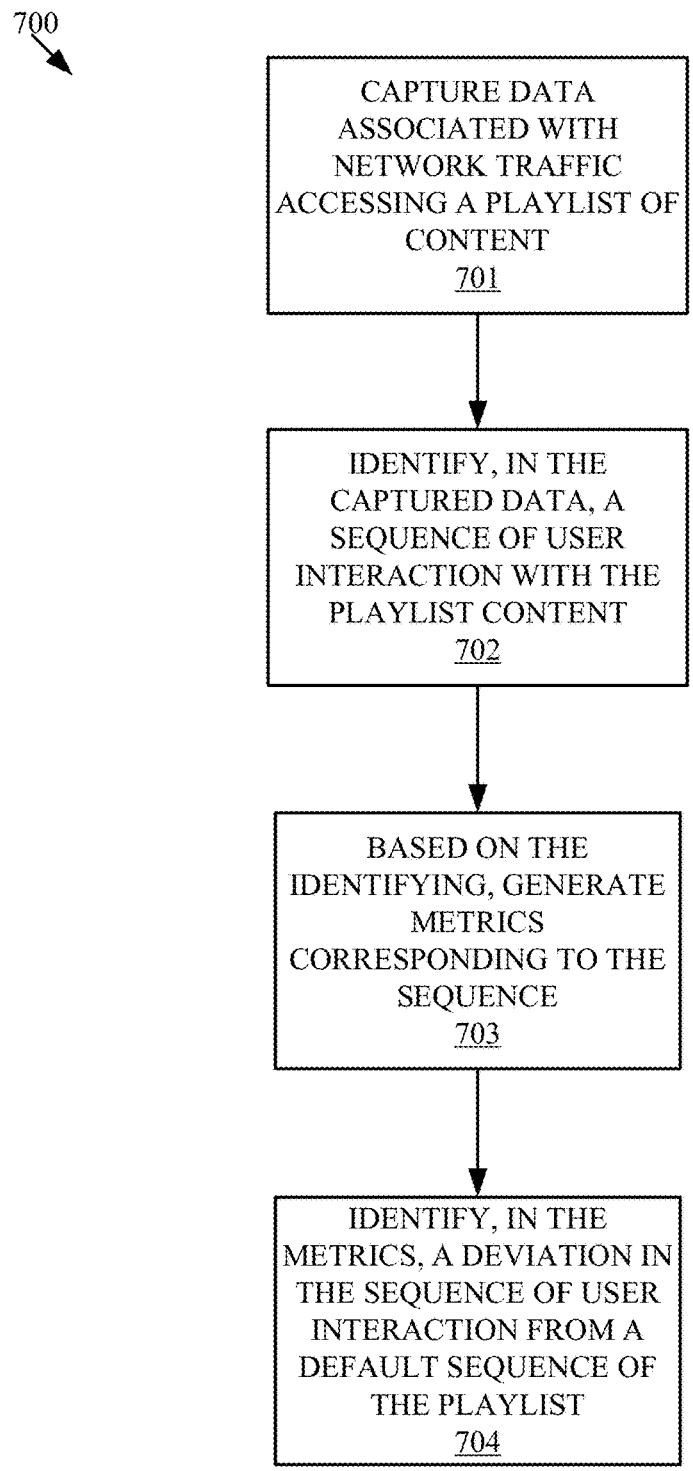
Figure 8:
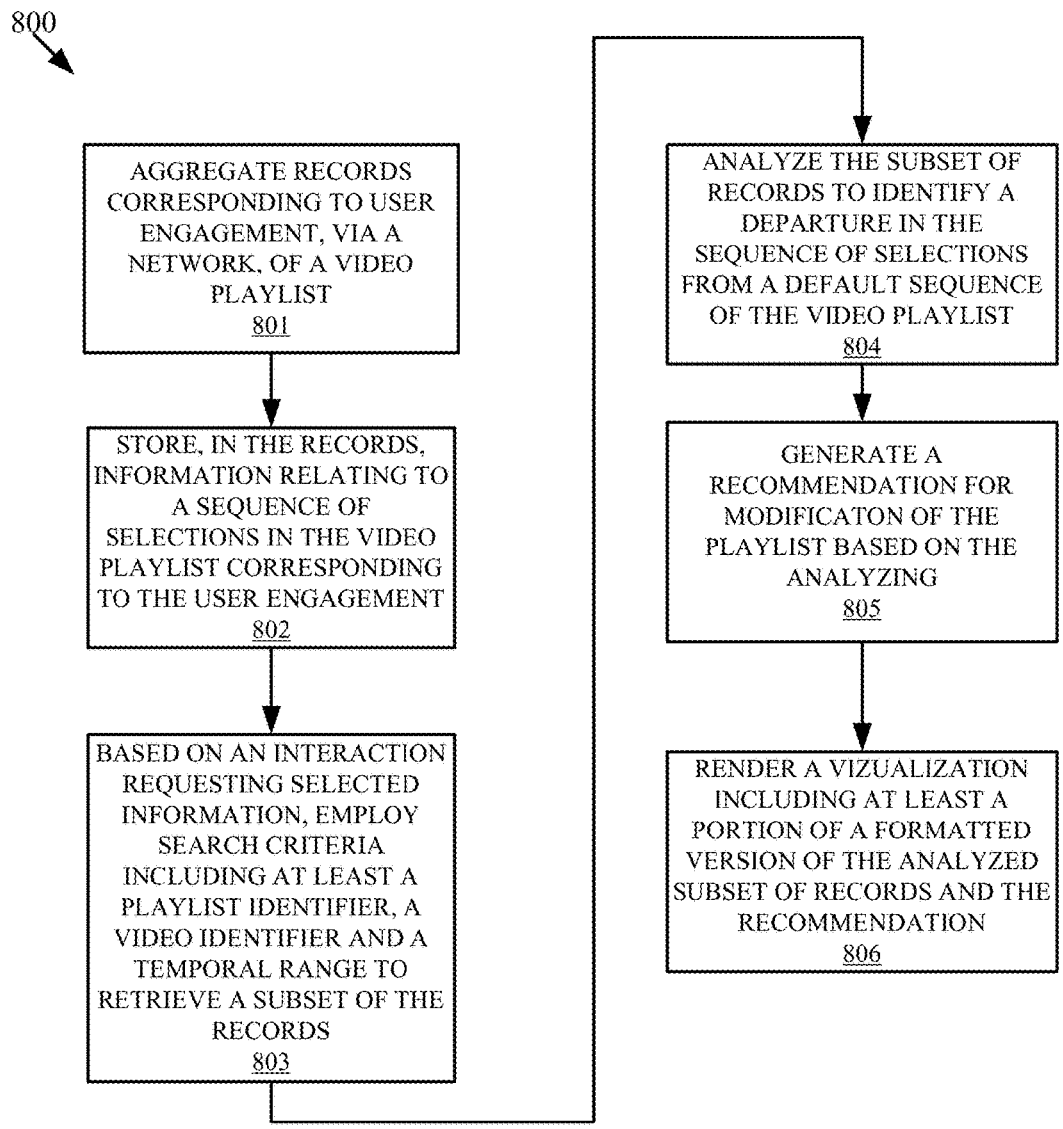

FIGS. 6-8 illustrate methodologies and/or flow diagrams in accordance with this disclosure. For simplicity of explanation, the methodologies are depicted and described as a series of acts. However, acts in accordance with this disclosure can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be appreciated that the methodologies disclosed in this specification are capable of being stored on an article of manufacture to facilitate transporting and transferring such methodologies to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with the following methodologies.

FIG. 6 illustrates an example methodology 600 that can be implemented by the playlist analytics system 100 described in the foregoing. The methodology 600 can comprise logging user traffic and interactions associated with a playlist of content (block 601) (e.g., using logging component 101). The methodology 600 can further comprise generating analytics regarding the logged user traffic and interactions (block 602) (e.g., using analytics component 102), and generating a report of the playlist analytics (block 603) (e.g., using reporting component 103).

FIG. 7 illustrates another example methodology 700 that can be implemented by the playlist analytics system 100. The methodology 700 can comprise capturing data associated with network traffic accessing a playlist of content (block 701, e.g., using logging component 101), and identifying, in the captured data, a sequence of user interaction with the playlist content (block 702, e.g., using analytics component 102). The methodology 700 can further comprise, based on the identifying, generating metrics corresponding to the sequence (block 703, e.g., using analytics component 102), and identifying, in the metrics, a deviation in the sequence of user interaction from a default sequence of the playlist (block 704, e.g., using analytics component 102 and reporting component 103).

FIG. 8 illustrates still another example methodology 800 that can be implemented by the playlist analytics system 100. The methodology 800 can comprise aggregating records corresponding to user engagement, via a network, of a video playlist (block 801, e.g., using logging component 101), and storing, in the records, information relating to a sequence of selections of videos in the video playlist corresponding to the user engagement (block 802, e.g., using logging component 101).

The methodology 800 can further comprise, based on an interaction requesting selected information, employing search criteria including at least a playlist identifier, a video identifier, and a temporal range to retrieve a subset of records from the stored records (block 803, e.g., using analytics component 102), and analyzing the subset of records to identify a departure in the sequence of selections from a default sequence of the video playlist (block 804, e.g., using analytics component 102). The methodology 800 can further comprise generating a recommendation for modification of the playlist based on the analyzing (block 805, e.g., using analytics component 102 and reporting component 103), and rendering a visualization including at least a portion of a formatted version of the analyzed subset of records and the recommendation (block 806, e.g., using reporting component 103).

Reference throughout this specification to "embodiments" means that a particular feature, structure, or characteristic described in connection with the embodiments is included in one or more embodiments. Thus, the appearances of the word "embodiments," or "in embodiments," in various places throughout this specification are not necessarily all referring to the same embodiments. Furthermore, the particular features, structures, or characteristics may be combined in any suitable manner in one or more embodiments.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g., generating interest points and/or fingerprints); software on a computer readable medium; or a combination thereof.

The aforementioned systems, circuits, modules, and so on have been described with respect to interaction between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

With reference to FIG. 9, a suitable environment 900 for implementing various aspects of the claimed subject matter includes a computer 902. The computer 902 includes a processing unit 904, a system memory 906, a codec 905, and a system bus 908. It is to be appreciated that the computer can be employed in connection with implementation one or more of the systems or components shown and described in connection with FIGS. 1-5. The system bus 908 couples system components including, but not limited to, the system memory 906 to the processing unit 904. The processing unit 904 can be any of various available processors. Dual microprocessors and other multiprocessor architectures also can be employed as the processing unit 904.

The system bus 908 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 994), and Small Computer Systems Interface (SCSI).

The system memory 906 includes volatile memory 910 and non-volatile memory 912. The basic input/output system (BIOS), containing the basic routines to transfer information between elements within the computer 902, such as during start-up, is stored in non-volatile memory 912. By way of illustration, and not limitation, non-volatile memory 912 can include read only memory (ROM), programmable ROM (PROM), electrically programmable ROM (EPROM), electrically erasable programmable ROM (EEPROM), or flash memory. Volatile memory 910 includes random access memory (RAM), which acts as external cache memory. According to present aspects, the volatile memory may store the write operation retry logic (not shown in FIG. 9) and the like. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM).

Computer 902 may also include removable/non-removable, volatile/non-volatile computer storage media. FIG. 9 illustrates, for example, a disk storage 914. Disk storage 914 includes, but is not limited to, devices like a magnetic disk drive, solid state disk (SSD) floppy disk drive, tape drive, Jaz drive, Zip drive, LS-100 drive, flash memory card, or memory stick. In addition, disk storage 914 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 914 to the system bus 908, a removable or non-removable interface is typically used, such as interface 916.

It is to be appreciated that FIG. 9 describes software that acts as an intermediary between users and the basic computer resources described in the suitable operating environment 900. Such software includes an operating system 918. Operating system 918, which can be stored on disk storage 914, acts to control and allocate resources of the computer system 902. Applications 920 take advantage of the management of resources by operating system 918 through program modules 924, and program data 926, such as the boot/shutdown transaction table and the like, stored either in system memory 906 or on disk storage 914. It is to be appreciated that the claimed subject matter can be implemented with various operating systems or combinations of operating systems.

A user enters commands or information into the computer 902 through input device(s) 928. Input devices 928 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 904 through the system bus 908 via interface port(s) 930. Interface port(s) 930 include, for example, a serial port, a parallel port, a game port, and a universal serial bus (USB). Output device(s) 936 use some of the same type of ports as input device(s) 928. Thus, for example, a USB port may be used to provide input to computer 902, and to output information from computer 902 to an output device 936. Output adapter 934 is provided to illustrate that there are some output devices 936 like monitors, speakers, and printers, among other output devices 936, which require special adapters. The output adapters 934 include, by way of illustration and not limitation, video and sound cards that provide a means of connection between the output device 936 and the system bus 908. It should be noted that other devices and/or systems of devices provide both input and output capabilities such as remote computer(s) 938.

Computer 902 can operate in a networked environment using logical connections to one or more remote computers, such as remote computer(s) 938. The remote computer(s) 938 can be a personal computer, a server, a router, a network PC, a workstation, a microprocessor based appliance, a peer device, a smart phone, a tablet, or other network node, and typically includes many of the elements described relative to computer 902. For purposes of brevity, only a memory storage device 940 is illustrated with remote computer(s) 938. Remote computer(s) 938 is logically connected to computer 902 through a network interface 942 and then connected via communication connection(s) 944. Network interface 942 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 944 refers to the hardware/software employed to connect the network interface 942 to the bus 908. While communication connection 944 is shown for illustrative clarity inside computer 902, it can also be external to computer 902. The hardware/software necessary for connection to the network interface 942 includes, for exemplary purposes only, internal and external technologies such as, modems including regular telephone grade modems, cable modems and DSL modems, ISDN adapters, and wired and wireless Ethernet cards, hubs, and routers.

Referring now to FIG. 10, there is illustrated a schematic block diagram of a computing environment 1000 in accordance with the subject specification. The system 1000 includes one or more client(s) 1002, which can include an application or a system that accesses a service on the server 1004. The client(s) 1002 can be hardware and/or software (e.g., threads, processes, computing devices). The client(s) 1002 can house cookie(s), metadata and/or associated contextual information by employing the specification, for example.

The system 1000 also includes one or more server(s) 1004. The server(s) 1004 can also be hardware or hardware in combination with software (e.g., threads, processes, computing devices). The servers 1004 can house threads to perform, for example, interest point detection, distorting, merging, pruning, mixing, fingerprint generation, matching score generation, or fingerprint comparisons in accordance with the subject disclosure. One possible communication between a client 1002 and a server 1004 can be in the form of a data packet adapted to be transmitted between two or more computer processes where the data packet contains, for example, an audio sample. The data packet can include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

The illustrated aspects of the disclosure may also be practiced in distributed computing environments where certain tasks are performed by remote processing devices that are linked through a communications network. In a distributed computing environment, program modules can be located in both local and remote memory storage devices.

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present invention. It is, of course, not possible to describe every conceivable combination of components or methodologies for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A method comprising:
    identifying a video playlist assembled by a playlist curator in a default sequence of videos for default playback by one or more users, wherein a first video is to be played first in the default playback;
    aggregating, by at least one processor, records corresponding to engagement with one or more video playlists by the one or more users, wherein the one or more video playlists comprise the video playlist;
    storing the records, wherein the stored records comprise information identifying playback sequences comprising sequences of selections of videos from the video playlist for playback corresponding to the engagement;
    receiving, from the playlist curator, a request comprising search criteria corresponding to the video playlist;
    responsive to receiving the request, obtaining a subset of the stored records based on the search criteria;
    performing an analysis of the sequences of selections in the subset of the stored records to identify an entry rate corresponding to a number of times that a play sequence began on a second video, wherein the entry rate identifies a departure in the playback sequences from the default sequence of videos for the default playback, the identified departure in the playback sequences representing a negative feedback indication regarding the video playlist; and
    generating a recommendation for the playlist curator to modify the default sequence of videos of the video playlist based on the identified departure within the playback sequences from the default playback, wherein one or more videos are to be re-ordered in the default sequence of vidoes of the video playlist based on the recommendation to begin the default sequence with the second video.

2. The method of claim 1, wherein the search criteria comprise at least one of a playlist identifier, a video identifier, or a temporal range.

3. The method of claim 1, wherein the one or more users comprise multiple users.

4. The method of claim 1, further comprising:
    generating visual information comprising at least a portion of a formatted version of the analyzed sequences of selections in the subset of the stored records and the recommendation.

5. The method of claim 4, wherein the visual information is generated in tangible form or electronic form.

6. The method of claim 4, wherein the visual information is indicative of a corresponding number of times per access of the video playlist that a particular video of the video playlist was skipped.

7. The method of claim 4, wherein the visual information comprises a histogram describing numbers of videos accessed from the video playlist per access of the video playlist.

8. A non-transitory computer-readable storage medium storing instructions that, when executed by at least one processor, cause the at least one processor to:
    identify a video playlist assembled by a playlist curator in a default sequence of videos for default playback by one or more users, wherein a first video is to be played first in the default playback;
    aggregate, by the at least one processor, records corresponding to engagement with one or more video playlists by the one or more users, wherein the one or more video playlists comprise the video playlist;
    store the records, wherein the stored records comprise information identifying playback sequences comprising sequences of selections of videos from the video playlist for playback corresponding to the engagement;
    receiving, from the playlist curator, a request comprising search criteria corresponding to the video playlist;
    responsive to receiving the request, obtaining a subset of the stored records based on the search criteria;
    perform an analysis of the sequences of selection in the subset of the stored records to identify an entry rate corresponding to a number of times that a play sequence began on a second video, wherein the entry rate identifies a departure in the playback sequences from the default sequence of videos for the default playback, the identified departure in the playback sequences representing a negative feedback indication regarding the video playlist; and
    generate a recommendation for the playlist curator to modify the default sequence of videos of the video playlist based on the identified departure within the playback sequences from the default playback, wherein one or more videos are to be re-ordered in the default sequence of videos of the video playlist based on the recommendation to begin the default sequence with the second video.

9. The non-transitory computer-readable storage medium of claim 8, wherein the search criteria comprise at least one of a playlist identifier, a video identifier, or a temporal range.

10. The non-transitory computer-readable storage medium of claim 8, wherein the one or more users comprise multiple users.

11. The non-transitory computer-readable storage medium of claim 8, wherein the instructions are further to cause the at least one processor to:
    generate visual information comprising at least a portion of a formatted version of the analyzed sequences of selections in the subset of the stored records and the recommendation.

12. The non-transitory computer-readable storage medium of claim 11, wherein the visual information is generated in tangible form.

13. The non-transitory computer-readable storage medium of claim 11, wherein the visual information is generated in electronic form.

14. The non-transitory computer-readable storage medium of claim 11, wherein the visual information is indicative of a corresponding number of times per access of the video playlist that a particular video of the video playlist was skipped.

15. The non-transitory computer-readable storage medium of claim 11, wherein the visual information comprises a histogram describing numbers of videos accessed from the video playlist per access of the video playlist.

16. A system comprising: at least one memory storing instructions; and
    at least one processor to execute the instructions to:
        identify a video playlist assembled by a playlist curator in a default sequence of videos for default playback by one or more users, wherein a first video is to be played first in the default playback;
        aggregate records corresponding to engagement with one or more video playlists by the one or more users, wherein the one or more video playlists comprise the video playlist;
        store the records, wherein the stored records comprise information identifying playback sequences comprising sequences of selections of videos from the video playlist for playback corresponding to the engagement;
        receive, from the playlist curator, a request comprising search criteria corresponding to the video playlist;
        responsive to receiving the request, obtain a subset of the stored records based on the search criteria;
        perform an analysis of the sequences of selections in the subset of the stored records to identify an entry rate corresponding to a number of times that a play sequence began on a second video, wherein the entry rate identifies a departure in the playback sequences from the default sequence of videos for the default playback, the identified departure in the playback sequences representing a negative feedback indication regarding the video playlist; and
        generate a recommendation for the playlist curator to modify the default sequence of videos of the video playlist based on the identified departure within the playback sequences from the default playback, wherein one or more videos are to be re-ordered in the default sequence of videos of the video playlist based on the recommendation to begin the default sequence with the second video.

17. The system of claim 16, wherein the one or more users comprise multiple users.

18. The system of claim 16, wherein the search criteria comprise at least one of a playlist identifier, a video identifier, or a temporal range.

* * * * *